June 26, 1945.　　　R. J. MILLER　　　2,379,174
TURBO TRANSMISSION
Filed April 28, 1941　　　2 Sheets-Sheet 2
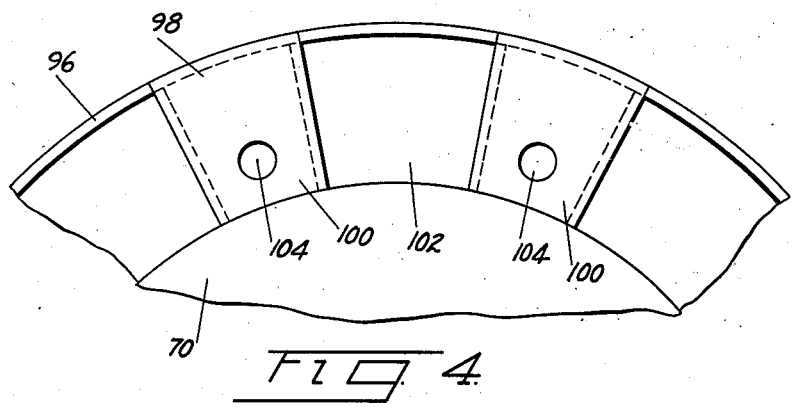
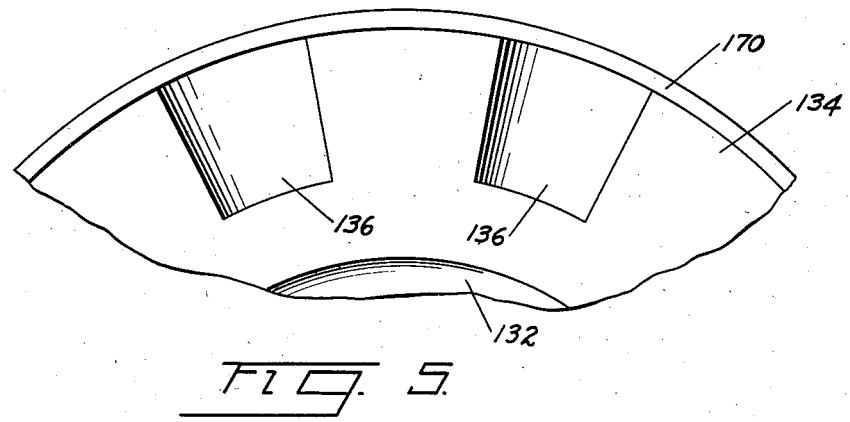
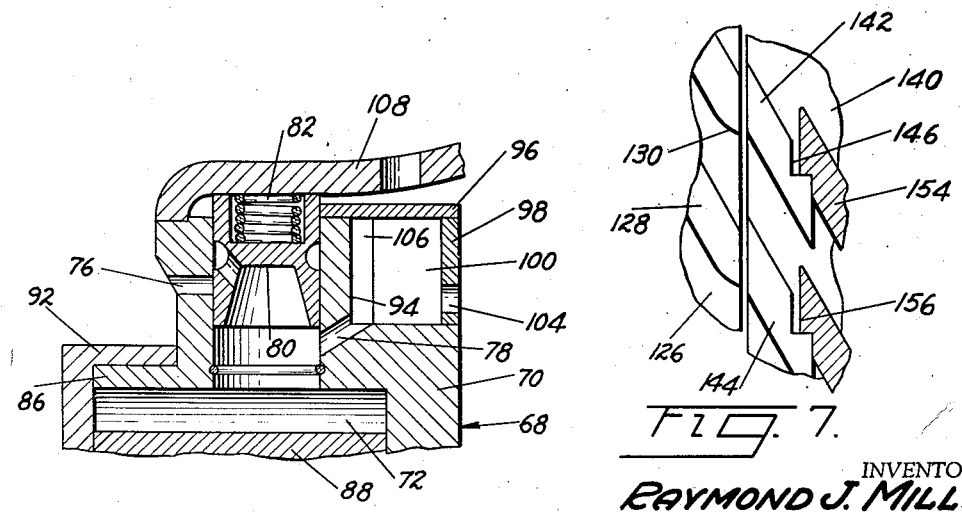
INVENTOR.
RAYMOND J. MILLER
BY
ATTORNEY Patented June 26, 1945

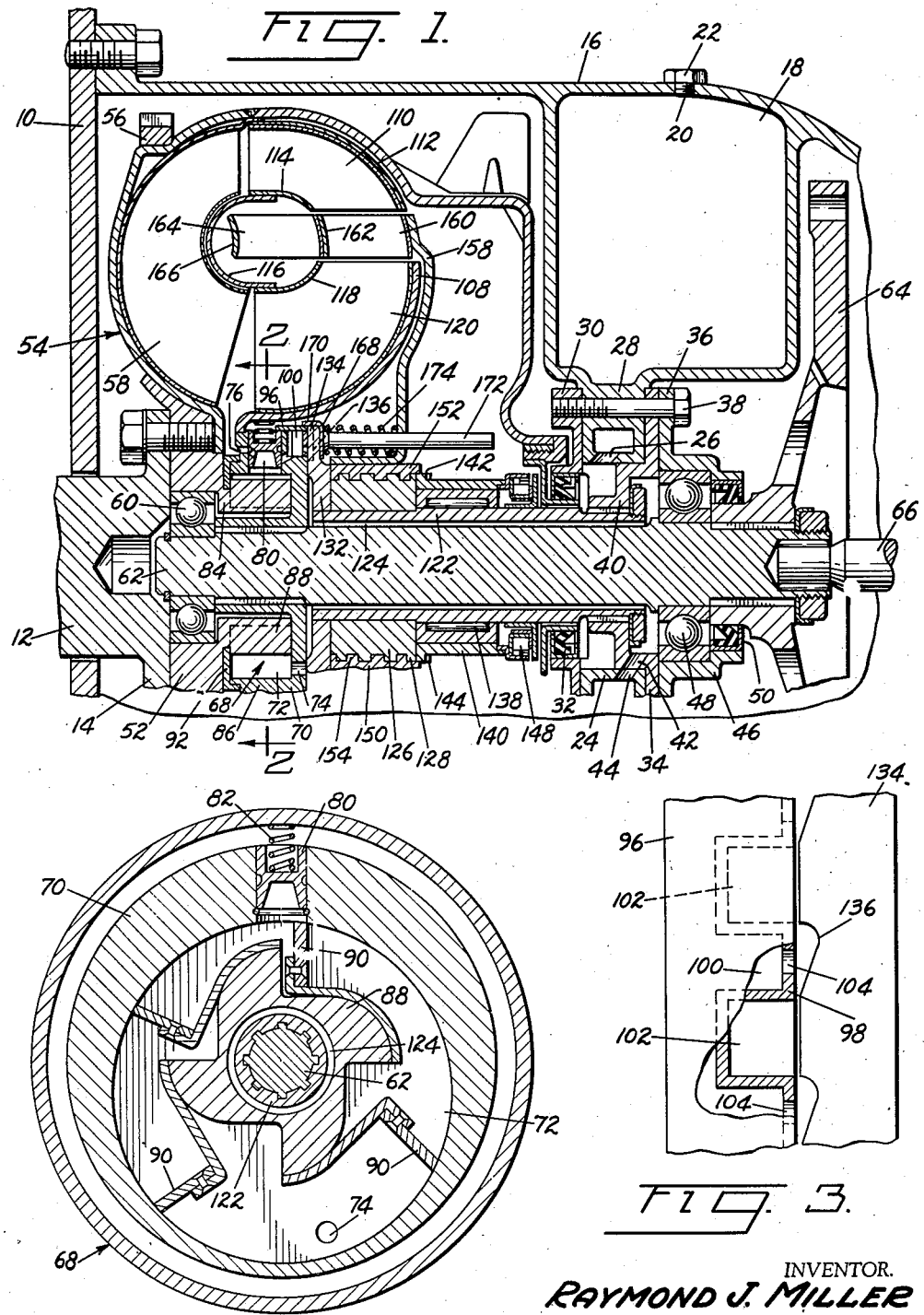

2,379,174

UNITED STATES PATENT OFFICE 2,379,174

TURBOTRANSMISSION

Raymond J. Miller, Detroit, Mich.

Application April 28, 1941, Serial No. 390,611

1 Claim. (Cl. 60—54)

This invention relates to turbotransmissions, and more particularly to turbotransmissions for motor vehicles.

Because of a differential in speed between the driving and driven members of a fluid coupling of the type generally used on motor vehicles, there is an inherent slippage between the members. This slip is at minimum when operating at high speed, and at maximum when the driving member is rotating at stalling speed of a motor supplying power to the driving member, with the driven member static, and during this maximum period of slip there is a tendency for the vehicle to creep forward. This is objectionable, and it is the aim of the instant invention to overcome this objectionable feature.

An object of the invention is to provide a fluid coupling for a motor vehicle including means for inhibiting creepage of the vehicle after coming to a stop.

Another object of the invention is to provide a fluid coupling including a pump for delivery of fluid to the coupling having the characteristic of varying pressure on the fluid in relation to the difference in speed between the driving and driven members of the coupling.

Other objects and advantages will appear from the following description taken in connection with the drawings forming a part of this specification, and in which, Fig. 1 is a sectional view, partly broken away, of a torque converter embodying the invention;

Fig. 2 is a sectional view substantially on line 2—2, Fig. 1, illustrating the pump and associated valve;

Fig. 3 is an enlarged detail view illustrating a variable retarding member;

Fig. 4 is a fragmentary view illustrating a part of the retarding means;

Fig. 5 is a fragmentary view illustrating another part of the retarding means;

Fig. 6 is a fragmentary view of the valve mechanism; and

Fig. 7 is a fragmentary view of the feed mechanism for the reaction member.

Referring to the drawings for more specific details of the invention, 10 represents a crank case of an internal combustion engine, and 12 the crank shaft of the engine having a conventional flange 14. A bell housing 16 suitably secured to the crank case includes a reservoir 18, having a filling opening 20 normally closed as by a plug 22. As shown, the reservoir is annular, and on its inner perimeter is a hollow flange 24 having direct communication with the reservoir, and arranged in this flange is an inlet port 26.

The hollow flange 24 has therein spaced webs 28 connecting the side walls of the flange and transverse openings extending through the flange and webs. A ring 30 supported on one side of the flange 24 has openings therethrough registering with the openings in the flange and webs. This ring provides a suitable carrier for a fluid seal 32. Oppositely disposed rings 34 and 36 supported on the other side of the flange 24 have corresponding openings registering with the openings in the flange and webs, and bolts 38 passed through the openings in the rings, the flange, and the webs serve to secure the rings against displacement. The ring 34 has a concentric sleeve 40 provided with internal splines, and an opening 42 through the ring in registration with an outlet port 44 in the flange 24, and the ring 36 has a concentric sleeve 46 providing a support for a bearing 48 and also for a fluid seal 50.

A hub 52 bolted or otherwise fixedly secured to the flange 14 of the crank shaft 12 supports a torque converter housing 54 within the bell housing 16. The housing 54 has thereon a ring gear 56 for connection of a starter, not shown, and suitably secured to the inner wall of the housing is a plurality of impeller blades 58. The hub 52 has therein a bearing 60, and a center shaft 62 is supported for rotation on the bearings 48 and 60 in axial alignment with the crank shaft 12. The center shaft 62 has splined thereto one member 64 of a conventional clutch, and suitably journaled in the end of the center shaft 62 adjacent the clutch member is a driven shaft 66 adapted to carry another clutch member, not shown, for cooperation with the clutch member 64.

A fluid delivery pump 68 of the rotary type includes a housing 70 splined to the center shaft 62. The housing has a chamber 72 arranged eccentrically therein. This chamber has an inlet port 74, a low pressure discharge port 76 and a high pressure discharge port 78, and a piston valve 80 for control of the discharge ports loaded by a spring 82. The valve is operative to normally maintain the low pressure port 76 open, and to open the high pressure port 78 and close the low pressure port upon attainment of a predetermined pressure in the valve chamber.

A shaft 84, integral with and concentrically of the hub 52, is extended through a sleeve 86 on one side of the housing 70 into the chamber 72, and the shaft 84 is milled to provide a rotor 88 having thereon a plurality of spring-pressed vanes 90 yieldingly engaging the wall of the chamber 72, and a collar 92 sleeved over the shaft is suitably secured to the sleeve 86.

The housing 70 of the pump has an annular shoulder 94 concentrically disposed with respect to the axis of the housing, and fixedly supported on this shoulder is a fluid check or retarder including a band 96 encircling an annular ring 98 having reversely disposed pockets 100 and 102, and the pockets 100 are provided with discharge ports 104. The annular ring 98 is fitted snugly on the shoulder 94, and the band 96 is secured to the housing to retain the ring 98 in spaced relation to the face of the shoulder so as to provide a passage 106 in direct communication with the high pressure port 78, and also to support the ring 98 substantially flush with a side wall of the housing.

A two-stage turbine includes a web 108 supported on the housing 70 of the pump 68 for rotation within the housing 54. The first stage of the turbine comprises a plurality of vanes 110 secured to an outer shroud section 112 and supported on an inner shroud section 114 fixedly attached to an inner shroud section 116 adjacent the blades 58 of the impeller, and the inner section 116 is fixedly attached to an inner shroud section 118 supported on a plurality of blades 120 mounted on the web 108 and constituting the second stage of the turbine.

A sleeve 122 slipped over the center shaft 62 and splined in the sleeve 40 is fixedly supported in spaced relation to the center shaft to provide an annular passage 124 between the sleeve and the shaft for delivery of fluid through the ports 42 and 44 communicating with the reservoir to the intake port 74 of the pump.

The sleeve 122 has a reduced portion adjacent its free end, and fitted on this reduced portion is a heavy sleeve 126 having external threads 128 with rounded approaches 130. A collar 132 is also fitted on the reduced portion, and the heavy sleeve and collar are spot-welded to one another and also to the sleeve 122. The collar 132 has an off-set portion 134 in spaced relation to the case or housing of the pump and also the member 98, and the off-set portion has therein spaced pockets 136 adapted to register alternately with the pockets 102, and the ports 104 of the pockets 100, so as to vary the pressure on the fluid when delivered by the pump through the high pressure port 78.

A needle bearing 138 on the sleeve 122 supports for rotation a sleeve 140 having a flange 142 provided with threads 144 of the same pitch as the threads on the heavy sleeve 126 for registration therewith. The approach end of the threads 144 have dogs 146, and suitably mounted on the sleeve 122 is an expansible member or brake 148 operative to maintain the sleeve 140 in abutting engagement with the sleeve 122 and to resist rotation thereof.

A carrier 150 mounted for travel on the sleeves 126 and 140 includes a collar or sleeve 152 having internal threads 154 for cooperation with the threads on the sleeves 126 and 140, and the approach ends of the threads 154 are provided with dogs 156 for cooperation with the dogs 146 on the threads of the sleeve 140.

The carrier 150 supports a reaction member including a web 158 having a press fit on the collar, and the web has arranged thereon a plurality of vanes 160 supporting a shroud 162 having thereon a plurality of indexing vanes 164, carrying an inner shroud 166.

A ring 168 supported on the offset portion of the collar 132 has thereon a flange 170 bridging the gap between the members 98 and 134 so as to check fluid flow. Spaced rods 172 supported on the ring 168 extend through openings in the web 158 of the reaction member, and sleeved on the rods are springs 174 of various lengths for effectively varying the resistance to movement of the reaction member into operative position.

In a normal operation, assuming that the unit is filled with fluid to substantially its capacity, force transmitted from the power plant to the impeller and pump results in driving the impeller and the pump. Initially the pump develops sufficient pressure to actuate the valve 80 so as to close the port 76 and open port 78 to thus divert the fluid to the pockets 102 and 136, which coact to restrain rotation of the turbine. When the impeller speed is high enough, the fluid discharged by the impeller against the turbine blades will overcome the restraining action of the pockets 102 and 136 so as to cause rotation of the turbine. Fluid is delivered by the pump to the impeller at a rate proportionate to the differential speed of rotation between the impller and the turbine. The impeller energizes the fluid, and the energy of the fluid is received on the first stage 110 of the turbine and on the vanes 160 of the reaction member 158. This causes rotation of the turbine, resulting in driving the center shaft 62 and the driven shaft 66 clutched to the center shaft. Upon rotation of the center shaft, the housing of the pump is driven in the same direction of rotation as the rotor of the pump, and, accordingly, the pump delivers a smaller volume of fluid to the impeller as the rotor and housing approach a 1 to 1 speed ratio.

As the speed of rotation of the impeller increases, the energy of the fluid increases proportionately, and this increased energy of the fluid acting on the vanes of the turbine results in increase in the speed of the turbine. As this increase of speed approaches that of the impeller, the angle of movement of the fluid leaving the first stage of the turbine shifts from impinging on the faces of the reaction vanes 160 to impinge on the backs of the reaction vanes, and this causes the reaction member to spiral on the threaded sleeve 126 out of the fluid circuit onto the sleeve 140, and as the reaction member retracts, the index vanes 164 supported on the reaction vanes move into position between the first and second stages of the turbine and direct the flow of fluid from the first stage of the turbine to the second stage thereof, and under this condition the unit functions as a fluid coupling.

During this stage of operation, the pump 68 delivers fluid through the low pressure port 76 into the vortex chamber or fluid circuit, and continues to do so while there is a small differential of speed between the impeller and the turbine. When the differential of speed between the impeller and the turbine increases, the pressure imposed by the pump on the fluid moves the valve 80 against the resistance of the spring 82 to close the low pressure port 76 and to open the high pressure port 78, whereupon the fluid enters the passage 106 and is distributed into the pockets 100 and discharged therefrom through the ports 104 into the chambers 136 communicating with the vortex chamber so as to retard rotation of the turbine.

Upon increase in differential speed of rotation between the impeller and the turbine, the volume of fluid delivered by the pump increases proportionately. During this period the fluid in the circuit energized by the impeller shifts its angle of discharge and impinges on the backs of the index vanes, causing the reaction member to spiral into the fluid circuit. Upon initial movement of the reaction member tending to spiral into the circuit, the threads 154 on the carrier 150 of the reaction member disengage the dogs 156 thereof from the dogs 146 and engage the threads 144 on the sleeve 140 and advance thereon to the approaches 130 on the threads 128. The approaches 130 serve to guide the threads 154 into engagement with the threads 128, and as the carrier advances on the threads 128, the reaction member spirals into the fluid circuit against the progressively increasing resistance imposed by the springs 174.

It is obvious from the foregoing that the pump 68 delivers fluid to the impeller at a rate proportionate to the relative differential speed of the impeller and the turbine, and that the maximum volume of fluid is delivered to the impeller when the turbine is static and the impeller is rotating at stalling speed, and, correspondingly, the minimum volume of fluid is delivered by the pump to the impeller when the unit is operating at its maximum efficiency.

While this invention has been described in connection with certain specific embodiments, the principle involved is susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

A fluid transmission comprising an impeller, a turbine providing in conjunction therewith a vortex chamber, a pump having its housing fixedly secured to the turbine and its rotor fixedly secured to the impeller, and a pressure actuated valve for control of the discharge of the pump operative to deliver fluid directly to the vortex chamber during one phase of operation and divert the fluid indirectly to the chamber during another phase of operation.

RAYMOND J. MILLER.